United States Patent [19]
Rolf

[11] Patent Number: 5,134,237
[45] Date of Patent: Jul. 28, 1992

[54] PYRIDONYL SUBSTITUTED ISOINDOLEHYDRAZONE METAL COMPLEX COMPOUNDS

[75] Inventor: Meinhardt Rolf, Charleston, S.C.

[73] Assignee: Bayer Aktiengesellschaft, Leverkusen, Fed. Rep. of Germany

[21] Appl. No.: 606,361

[22] Filed: Oct. 31, 1990

[30] Foreign Application Priority Data

Nov. 7, 1989 [DE] Fed. Rep. of Germany ....... 3937004

[51] Int. Cl.$^5$ ................. C07D 401/14; C07D 417/14; C09B 57/04; C09B 26/02
[52] U.S. Cl. ....................................... 546/6; 544/225; 524/83; 524/92; 524/94
[58] Field of Search ............................ 546/6; 544/225

[56] References Cited

U.S. PATENT DOCUMENTS

| 3,646,033 | 2/1972 | Leister et al. ................... 260/250 R |
| 3,794,659 | 2/1974 | Leister et al. ...................... 260/305 |
| 4,237,293 | 12/1980 | L'Eplattenier et al. ................ 546/7 |
| 4,628,093 | 12/1986 | Neeff ...................................... 546/6 |

FOREIGN PATENT DOCUMENTS

| 17003 | 10/1980 | European Pat. Off. . |
| 0074924 | 3/1983 | European Pat. Off. . |
| 1127885 | 12/1956 | France . |

Primary Examiner—Mark L. Berch
Attorney, Agent, or Firm—Sprung Horn Kramer & Woods

[57] ABSTRACT

Compounds of the formula

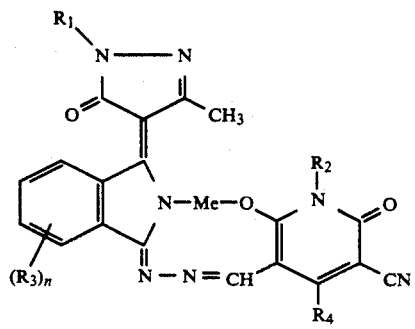

wherein
Me denotes Zn, Cu, Co (II) or Ni;
$R_1$ denotes hydrogen, optionally substituted aryl or optionally substituted hetaryl;
$R_2$ denotes hydrogen, optionally substituted alkyl, cycloalkyl, aralkyl, aryl or hetaryl;
$R_3$ denotes a substituent;
n denotes 0–4; and
$R_4$ denotes hydrogen or methyl;

are suitable for pigmenting macromolecular substances and give very fast pigmentation.

7 Claims, No Drawings

PYRIDONYL SUBSTITUTED ISOINDOLEHYDRAZONE METAL COMPLEX COMPOUNDS

The present invention relates to compounds of the formula

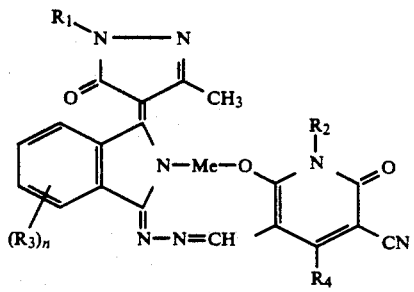

wherein
Me = Zn, Cu, Co-II or Ni,
$R_1$ = H, aryl or hetaryl
$R_2$ = H, alkyl, aryl, hetaryl, aralkyl or cycloalkyl,
$R_3$ = a substituent,
$R_4$ = H or $CH_3$ and
n = 0 to 4.

The radicals $R_3$ can be identical or different. Me preferably represents Ni. The alkyl, aryl, aralkyl, cycloalkyl and hetaryl radicals can optionally be substituted.

Alkyl preferably represents optionally substituted $C_1$–$C_{20}$-alkyl (substituents are, for example, acylamino, in particular $C_1$–$C_4$-alkylcarbonylamino, carbamoyl, $C_1$–$C_{20}$-alkoxy, COOH, OH, OCONHR, where R = alkyl or aryl, or aromatic radicals, such as benzyl), it also being possible for the alkyl chain to be interrupted by heteroatoms, for example O.

Aryl preferably represents phenyl or naphthyl, optionally substituted by 1 to 4 substituents from the series comprising halogen, such as Cl, Br and F; $C_1$–$C_4$-alkyl, $C_1$–$C_4$-alkoxy, carbamoyl, mono- and di-$C_1$–$C_4$-alkylcarbamoyl, COOH, $NO_2$, CN, $CF_3$, acylamino, in particular $C_1$–$C_4$-alkylcarbonylamino and optionally substituted phenylcarbonylamino (preferably 1 to 3 substituents from the group comprising Cl, Br, $NO_2$ and $C_1$–$C_4$-alkyl), ureido, mono-$C_1$–$C_4$-alkylureido and N-phenylureido (optionally substituted in the phenyl ring by 1 to 3 substituents from the group comprising Cl, $NO_2$, CN, $C_1$–$C_4$-alkyl and $C_1$–$C_4$-alkoxy).

Aralkyl preferably represents phenyl-$C_1$–$C_4$-alkyl, it being possible for the phenyl radical to be substituented as mentioned above.

Cycloalkyl preferably represents $C_3$–$C_7$-cycloalkyl, for example cyclopentyl or cyclohexyl.

Hetaryl preferably represents optionally substituted benzimidazol-2-yl, benzothiazol-2-yl, pyridyl or 4-quinazolon-2-yl (substituents are, preferably 1 to 4 from the group comprising Cl, Br, F, $NO_2$, COOH and CN).

Examples of suitable substituents $R_3$ are halogen (Cl and Br), $NO_2$, carbamoyl, mono- and di-$C_1$–$C_4$-alkylcarbamoyl, $C_1$–$C_4$-alkoxy, $C_1$–$C_4$-alkylthio and phenylthio, optionally substituted by 1 to 3 substituents from the group comprising Cl, $NO_2$, CN and $C_1$–$C_4$-alkyl.

The radicals $R_3$ can be identical or different.

Preferred aryl radicals $R_1$ are phenyl, chlorophenyl, 3,4-dichlorophenyl, 2,5-dichlorophenyl and nitrophenyl.

Preferred aryl radicals $R_2$ are phenyl, tolyl, chlorophenyl and 4-ethoxyphenyl.

The pigments according to the invention are prepared, for example, by reaction of isoindoles of the formula

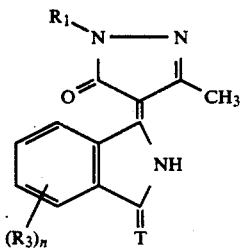

in which T represents NH or $(Oalkyl)_2$ and $R_1$, $R_3$ and n have the abovementioned meaning, with pyridone derivatives of the formula

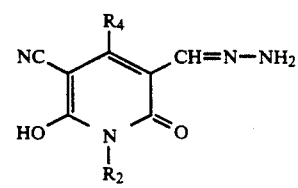

in which $R_2$ and $R_4$ have the abovementioned meaning, to give compounds of the formula

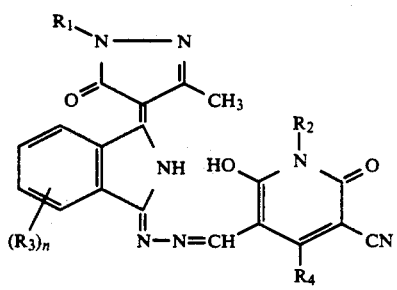

which are reacted directly or after intermediate isolation with a compound $MeX_2$ (ME = Ni, Cu, Co or Zn; X or $X_2$ preferably = acetate, formate, chloride or sulphate) to give the metal complex of the formula (I).

Alternatively, the reaction of (II) with (III) can be carried out in the presence of $MeX_2$, in which case the complexes (I) are formed directly.

The complexes (I) are also accessible analogously by reaction of an isoindole-hydrazone of the formula

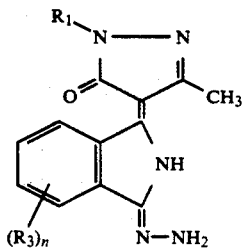

with a pyridone derivative of the formula

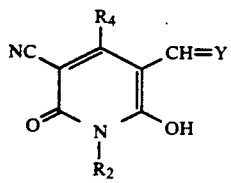
(VI)

in which Y represents O or N-Ph, wherein Ph designates optionally substituted phenyl, and $R_2$ and $R_4$ have the abovementioned meaning.

(IV) is likewise formed in this reaction and can then be reacted directly or after intermediate isolation to give the complex (I).

The starting materials of the formulae (II), (III), (V) and (VI) are known from the literature or can be prepared by processes analogous to those known from the literature.

The reactions are carried out in organic solvents, for example dimethylformamide, n-butanol or glycol monomethyl ether, preferably at temperatures between 50° and 150° C.

Some of the pigments (I) occur in a plurality of modifications which can be obtained by subsequent heat treatment at elevated temperatures or by finishing processes.

Because of their good pigment properties, the pigments of the formula (I) are suitable for the most diverse pigment applications. They can thus be used for the preparation of very fast pigmented systems, such as mixtures with other substances, formulations, paints, printing inks, coloured paper and coloured macromolecular substances. Mixtures with other substances can be understood, for example, as being those with organic white pigments, such as titanium dioxide (rutile). Formulations are, for example, flush pastes containing organic liquids and if appropriate preservatives. The term paints represents, for example, coatings which dry by physical means or oxidation, stoving enamels, reactive coatings, two-component coatings, emulsion paints for weatherproof finishes and distempers. Printing inks are to be understood as those for printing paper, textiles and sheet metal. The new pigments are particularly suitable for pigmenting macromolecular organic substances.

The macromolecular substances can be of natural origin, such as rubber, or can be obtained by chemical modification, such as acetyl cellulose, cellulose butyrate or viscose, or produced synthetically, such as polymers, polyaddition products and polycondensates. Plastic compositions, such as polyvinyl chloride, polyvinyl acetate, polyvinyl propionate, polyolefins, for example polyethylene, or polyamides, high molecular weight polyamides, polymers and copolymers of acrylic esters or methacrylic esters, acrylonitrile, acrylamide, butadiene and styrene, as well as polyurethanes and polycarbonates may be mentioned. The substances pigmented with the pigments claimed can be in any desired form. Because of their high transparency and fastness to weathering, the pigments of the formula (I) are particularly suitable for use in car finishes, in particular for metallic paints.

The pigments of the formula (I) are excellently fast to water, fast to oil, fast to acid, fast to lime, fast to alkali, fast to solvents, fast to overvarnishing, fast to overspraying, fast to sublimation, resistant to heat and resistant to vulcanization, have a very good tinctorial strength and can easily be distributed in plastic compositions, and in particular are excellently fast to light and fast to migration.

EXAMPLE 1

12 g of the isoindole derivative of the formula

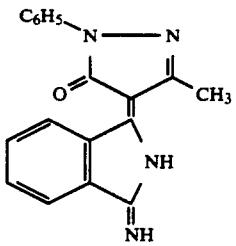

prepared from aminoimino-isoindolenine and 5-methyl-2-phenyl-3H-pyrazol-3-one in methanol, are stirred with 8 g of the hydrazone of the formula

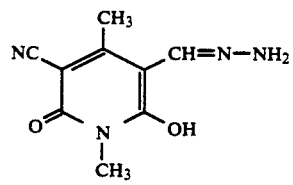

prepared from the corresponding aldehyde with hydrazine hydrate in ethanol, in 250 ml of dimethylformamide at 90° C. for 2 hours. 9.9 g of nickel acetate tetrahydrate are then added and the mixture is heated briefly to 120° C. The product is filtered off hot with suction and washed with dimethylformamide, methanol and water.

Bluish-tinged red crystals of the complex of the formula

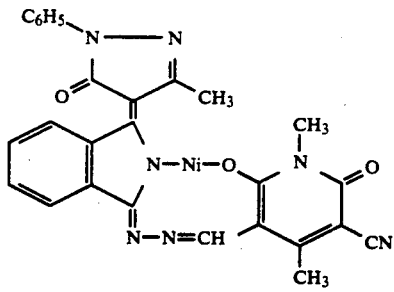

are obtained.

Melting point: >300° C.

IR: 3430, 2220, 1626, 1594, 1557, 1494, 1303, 1255, 1162, 1016

UV: double bands 524 and 554 nm (31000 and 31000) in pyridine

MS: 547 (100%) M⊕, 118 (18%).

EXAMPLE 2

If the procedure is analogous to Example 1 and, instead of the isoindole intermediate product employed in that example, an equimolar amount of the compound is used, a red nickel complex of the structure

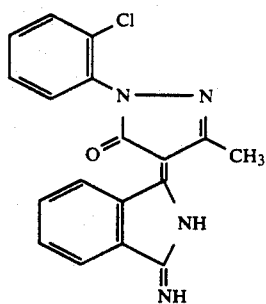

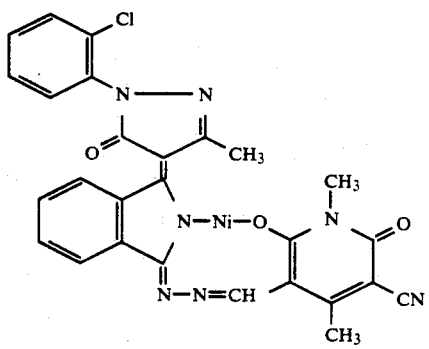

(I)

is obtained accordingly.

Melting point: >300° C.

IR: 3438, 2216, 1627, 1597, 1557, 1492, 1335, 1016, 771, 749.

MS: 581 (100%) M⊕, 152 (10%)

UV: double bands 524 and 556 nm (32000 and 31500) in pyridine

EXAMPLES 3 TO 12

By a process analogous to that mentioned in Example 1, using the corresponding starting materials characterized by $R_1$ and $R_2$

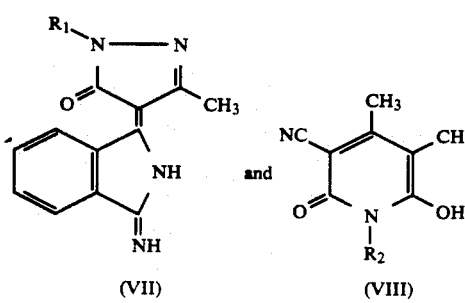

(VII)        and        (VIII)

nickel complexes of the structure

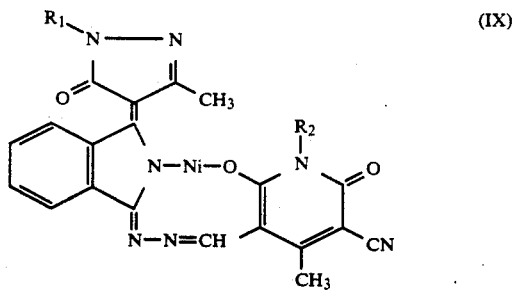

(IX)

having the colour shades and UV data mentioned in Table 1 are obtained.

| Example | VII, $R_1$ | VIII, $R_2$ | Colour shade | UV data $\lambda_{max}$, $\epsilon$ (pyridine) |
|---|---|---|---|---|
| 3 | H | $C_2H_5$ | brilliant red | 459 and 529 (21000 and 29000) |
| 4 | H | $C_6H_5$ | red | 459 and 529 (19500 and 25000) |
| 5 | $C_6H_5$ | H | red | 525 and 556 (32000 and 31500) |
| 6 | $C_6H_5$ | $C_2H_5$ | brilliant red | 524 and 556 (30500 and 30000) |
| 7 | $C_6H_5$ | $C_6H_5$ | red | 526, 559 (29000 and 29000) |
| 8 | ![m-tolyl-Cl] | $CH_3$ | red | 526, 559 (27000 and 27500) |
| 9 | ![2,3-dichlorophenyl] | n-$C_4H_9$ | red | 524 and 559 (30000 and 31000) |
| 10 | ![p-nitrotolyl] | $CH_3$ | red | 526, 559 (27000 and 29500) |
| 11 | $C_6H_5$ | ![p-chlorotolyl] | red | 526, 559 (27000 and 27000) |
| 12 | $C_6H_5$ | ![p-ethoxytolyl] | red | 526, 559 (24000 and 23500) |

EXAMPLES 13 TO 15

If the procedure is as according to Example 1 and the nickel acetate is replaced by equimolar amounts of copper acetate, zinc acetate or cobalt(II) acetate, pigments of the formula

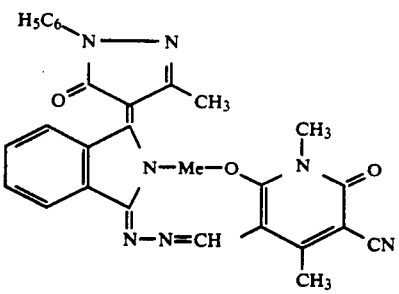

having the colour shades shown in the table are obtained.

| Example | Me | Colour shade |
|---------|----|--------------|
| 13 | Cu | Brown |
| 14 | Zn | Yellow |
| 15 | Co | Red-brown |

EXAMPLES 16 TO 19

If the procedure is as according to Example 1 and the isoindole intermediate product used there is replaced by an equimolar amount of a product substituted in the isoindolearomatic group, pigments of the formula

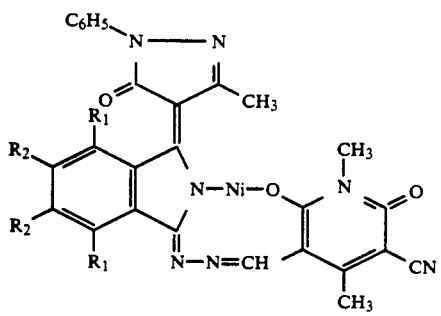

having the colour shades shown in the table are obtained analogously.

| Example | $R_1$ | $R_1$ | $R_2$ | $R_2$ | Colour shade |
|---------|-------|-------|-------|-------|--------------|
| 16 | H | H | Cl | H | Red |
| 17 | H | H | $NO_2$ | H | Red-brown |
| 18 | Cl | Cl | Cl | Cl | Orange |
| 19 | Cl | Cl | OMe | Cl | Red |

EXAMPLE 20

4 g of finely ground pigment according to Example 1 are dispersed in 92 g of a stoving enamel of the following composition:
33% of alkyd resin
15% of melamine resin
5% of glycol monomethyl ether
34% of xylene
13% of butanol Possible alkyd resins are product based on synthetic and vegetable fatty acids, such as coconut oil, castor oil, hydrogenated castor oil, linseed oil and the like. Instead of melamine resins, urea resins can be used.

After the dispersion has been performed, the pigmented enamel is applied to foils of paper, glass, plastic or metal and stoved at 130° C. for 30 minutes, a brilliant red coating being obtained.

EXAMPLE 21

6 parts of pigment according to Example 1 are dispersed in 12 parts of xylene 4.1 parts of butyl acetate and 0.7 parts of n-butanol with 22.5 parts of a 20% strength solution of cellulose acetobutyrate in butyl acetate/xylene (2:1) in a Red Devil containing 2 to 3 mm of glass beads for 30 minutes. After "fattening up" by addition of 10 parts of a saturated polyester resin (Dynapol H 700) 7.3 parts of melamine resin, 8.7 parts of a 20% strength solution of cellulose acetobutyrate in butyl acetate/xylene (2:1) 18 parts of butyl acetate, 1.6 parts of n-butanol and 9.7 parts of xylene, dispersion is carried out for another 5 minutes.

A dispersion of aluminium paste (60%) in an organic solvent (about 1:2) is added to this finish in an amount such that the ratio of pigment:Al comes to between 80:12 and 1:99.

This finish is brushed on and, after drying, coated with a clearcoat based on acrylate/melamine resin, which can contain other auxiliaries, such as, for example, UV absorbers, and stoved.

A red metallic finish with a brilliant colour shade and excellent fastness to weathering is obtained.

EXAMPLE 22

0.2 g of the pigment obtained according to Example 1 are dispersed in 65 g of stabilized PVC and 35 g of diisooctyl phthalate at 160° C. on a mixing mill and the composition is milled at 160° C. A red film of very good fastness to light and migration is obtained.

I claim:
1. Compounds of the structure

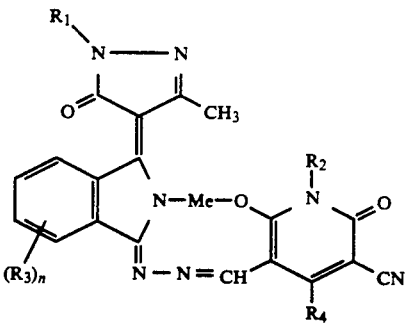

Me denotes Ni;
$R_1$ denotes hydrogen;
or denotes aryl, which is unsubstituted or substituted by 1-4 substituents independently selected from the group consisting of halogen, $C_{1-4}$-alkylcarbamoyl, COOH, $NO_2$, CN, $CF_3$, $C_{1-4}$-alkylcarbonylamino, phenylcarbonylamino, phenylcarbonylamino substituted by 1-3 substituents selected from the group consisting of Cl, Br, $NO_2$ and $C_{1-4}$-alkyl radicals, ureido, mono-$C_{1-4}$-alkylureido, N-phenylureido, and N-phenylureido substituted in the phenyl ring by 1-3 substituents selected from the group consisting of Cl, $NO_2$, CN, $C_{1-4}$-alkyl and $C_{1-4}$-alkoxy radicals;

or denotes benzimidazol-2-yl, benzothiazol-2-yl, pyridyl or 4-quinazolon-2-yl, each of which is unsubstituted or substituted by 1–4 substituents selected from the group consisting of Cl, F, $NO_2$, COOH and CN;

$R_2$ denotes hydrogen;

or denotes alkyl which is unsubstituted or substituted by a substituent selected from the group consisting of $C_{1-4}$-alkylcarbonylamino, carbamoyl, $C_{1-20}$-alkoxy, COOH, OH, OCONH-alkyl, OCONH-aryl, and benzyl;

or denotes cycloalkyl;

or denotes aralkyl, which is unsubstituted or substituted in the aryl part by 1–4 substituents independently selected from the group consisting of halogen, $C_{1-4}$-alkyl, $C_{1-4}$-alkoxy, carbamoyl, mono-$C_{1-4}$-alkylcarbamoyl, di-$C_{1-4}$-alkylcarbamoyl, COOH, $NO_2$, CN, $CF_3$, $C_{1-4}$-alkylcarbonylamino, phenylcarbonylamino, phenylcarbonylamino substituted by 1–3 substituents selected from the group consisting of Cl, Br, $NO_2$ and $C_{1-4}$-alkyl radicals, ureido, mono-$C_{1-4}$-alkylureido, N-phenylureido, and N-phenylureido substituted in the phenyl ring by 1–3 substituents selected from the group consisting of Cl, $NO_2$, CN, $C_{1-4}$-alkyl and $C_{1-4}$-alkoxy radicals;

or denotes aryl, which is unsubstituted or substituted by 1–4 substituents independently selected from the group consisting of halogen, $C_{1-4}$-alkyl, $C_{1-4}$-alkoxy, carbamoyl, mono-$C_{1-4}$-alkylcarbamoyl, di-$C_{1-4}$-alkylcarbamoyl, COOH, $NO_2$, CN, $CF_3$, $C_{1-4}$-alkylcarbonylamino, phenylcarbonylamino, phenylcarbonylamino substituted by 1–3 substituents selected from the group consisting of Cl, Br, $NO_2$ and $C_{1-4}$-alkyl radicals, ureido, mono-$C_{1-4}$-alkylureido, N-phenylureido, and N-phenylureido substituted in the phenyl ring by 1–3 substituents selected from the group consisting of Cl, $NO_2$, CN, $C_{1-4}$-alkyl and $C_{1-4}$-alkoxy radicals;

or denotes benzimidazol-2-yl, benzothiazol-2-yl, pyridyl or 4-quinazolon-2-yl, each of which is unsubstituted or substituted by 1–4 substituents selected from the group consisting of Br, Cl, F, $NO_2$, COOH and CN;

$R_3$ denotes halogen, $NO_2$, carbamoyl, mono- and di-$C_{1-4}$-alkylcarbamoyl, $C_{1-4}$-alkoxy, $C_{1-4}$-alkylthio, phenylthio, or phenylthio substituted by 1–3 substituents selected from the group consisting of Cl, $NO_2$, CN and $C_{1-4}$-alkyl radicals;

n denotes 0 to 4; and $R_4$ denotes hydrogen or methyl.

2. Compounds of claim 1, wherein $R_1$ denotes hydrogen;

or denotes phenyl, α-naphthyl, or β-naphthyl, which are unsubstituted or substituted by 1 to 4 substituents selected from the group consisting of halogen, $C_{1-4}$-alkoxy, carbamoyl, mono-$C_{1-4}$-alkylcarbamoyl, carboxyl, nitro, cyano, trifluoromethyl, $C_{1-4}$-alkylcarbonylamino, benzoylamino, and benzoylamino substituted by 1 to 3 substituents selected from the group consisting of chlorine, bromine, nitro, and $C_{1-4}$-alkyl;

or denotes α-pyridyl or β-pyridyl, which are unsubstituted or substituted by 1 to 4 substituents selected from the group consisting of halogen, $C_{1-4}$-alkoxy, carbamoyl, mono-$C_{1-4}$-alkylcarbamoyl, carboxyl, nitro, cyano, trifluoromethyl, $C_{1-4}$-acylamino, benzoylamino, and benzoylamino substituted by 1 to 3 substituents selected from the group consisting of chlorine, bromine, nitro, and $C_{1-4}$-alkyl;

$R_2$ denotes hydrogen;

or denotes $C_{1-20}$-alkyl;

or denotes $C_{2-6}$-alkyl substituted by $C_{1-20}$-alkoxy, carboxyl, $C_{1-4}$-alkylcarbonylamino, benzoylamino, or chlorinated benzoylamino;

or denotes aralkyl which is unsubstituted or substituted by 1 to 3 substituents selected from the group consisting of chlorine, nitro, $C_{1-4}$-alkyl, carbamoyl, or cyano;

or denotes phenyl which is unsubstituted or substituted by 1 to 3 substituents selected from the group consisting of halogen, nitro, $C_{1-4}$-alkyl, $C_{1-4}$-alkoxy, ureido, mono-$C_{1-4}$alkylureido, N-phenylureido, and N-phenylureido substituted in the phenyl ring by 1 to 3 substituents selected from the group consisting of chlorine, nitro, cyano, $C_{1-4}$-alkyl, and $C_{1-4}$-alkoxy;

or denotes a heterocyclic radical of the formula

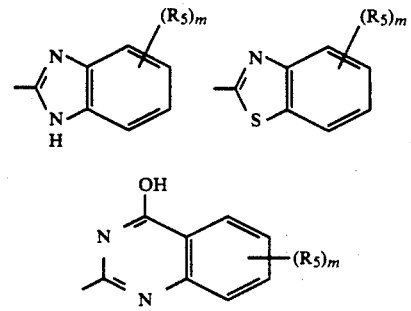

wherein $R_5$ denotes chlorine, bromine, fluorine, nitro, carboxyl, or cyano;

m denotes 0 to 4; and $R_3$ denotes halogen, nitro, carbamoyl, mono-$C_{1-4}$-alkylcarbamoyl, $C_{1-4}$-alkoxy, $C_{1-4}$-alkylmercapto, phenylmercapto, or phenylmercapto substituted by 1 to 3 substituents selected from the group consisting of chlorine, nitro, cyano and $C_{1-4}$-alkyl.

3. Compounds according to claim 1 where n=0.

4. Compound of the formula

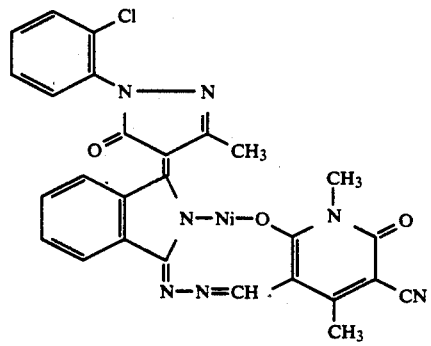

5. Compounds according to claim 2 where $R_2$=hydrogen, $C_1$-$C_6$-alkyl or benzyl, or phenyl which is unsubstituted or substituted by chlorine, nitro, methyl or $C_1$-$C_2$-alkoxy.

6. Compounds according to claim 5 where $R_1$ = hydrogen, or phenyl which is unsubstituted or mono- or disubstituted by chlorine, nitro or methyl.
7. Compound of the formula
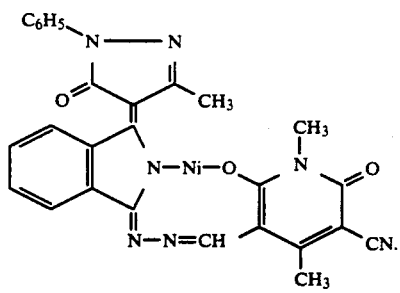
* * * * *

UNITED STATES PATENT AND TRADEMARK OFFICE
CERTIFICATE OF CORRECTION

PATENT NO. : 5,134,237

DATED : July 28, 1992

INVENTOR(S) : Meinhardt Rolf

It is certified that error appears in the above-identified patent and that said Letters Patent is hereby corrected as shown below:

Col. 8, line 59   After " halogen " insert -- $C_{1-4}$-alkyl, $C_{1-4}$-alkoxy, carbamoyl, mono-$C_{1-4}$-alkylcarbamoyl, di- --

Signed and Sealed this

Twenty-first Day of December, 1993

Attest:

BRUCE LEHMAN

*Attesting Officer*      Commissioner of Patents and Trademarks